(12) United States Patent
Sullivan et al.

(10) Patent No.: US 12,304,367 B1
(45) Date of Patent: May 20, 2025

(54) MODULAR VAN SYSTEM

(71) Applicants: Royce John Sullivan, Temecula, CA (US); Jerry Stanley Sullivan, Temecula, CA (US)

(72) Inventors: Royce John Sullivan, Temecula, CA (US); Jerry Stanley Sullivan, Temecula, CA (US)

( * ) Notice: Subject to any disclaimer, the term of this patent is extended or adjusted under 35 U.S.C. 154(b) by 0 days.

(21) Appl. No.: 18/961,018

(22) Filed: Nov. 26, 2024

(51) Int. Cl.
*B60N 2/34* (2006.01)
*A47C 17/80* (2006.01)
*B60N 2/30* (2006.01)

(52) U.S. Cl.
CPC .............. *B60N 2/34* (2013.01); *A47C 17/80* (2013.01); *B60N 2/3022* (2013.01)

(58) Field of Classification Search
CPC ...... B60N 2/34; B60N 2/3022; B60N 3/2047; B60N 3/008; B60P 3/38; B60P 3/39; A47C 17/80
USPC ................. 5/2.1, 188; 296/65.01, 69, 190.02
See application file for complete search history.

(56) References Cited

U.S. PATENT DOCUMENTS

| | | | |
|---|---|---|---|
| 3,181,911 A | 5/1965 | Peras | |
| 3,246,347 A * | 4/1966 | Mason | B60N 2/34 5/118 |
| 3,570,025 A | 3/1971 | Sullivan | |
| 3,604,022 A | 9/1971 | Smith | |
| 3,946,678 A * | 3/1976 | Birge, II | B60P 3/36 296/156 |
| 4,005,898 A * | 2/1977 | Way | B60P 3/423 5/118 |
| 4,190,911 A * | 3/1980 | Wadsworth | B60P 3/38 5/41 |
| 4,199,188 A | 4/1980 | Albrecht | |
| 4,200,329 A | 4/1980 | Inami | |
| 4,231,144 A | 11/1980 | Bernacchia, Jr. | |
| 4,505,509 A | 3/1985 | Simeri | |
| 4,573,225 A | 3/1986 | Wolf | |
| 4,779,917 A | 10/1988 | Campbell | |
| 5,452,972 A | 9/1995 | Adams | |

(Continued)

FOREIGN PATENT DOCUMENTS

| | | |
|---|---|---|
| DE | 102013006515 A1 | 10/2013 |
| DE | 202020001941 U1 * | 8/2020 |
| EP | 1867522 | 12/2007 |

*Primary Examiner* — David R Hare
(74) *Attorney, Agent, or Firm* — QuickPatents; Kevin Prince

(57) ABSTRACT

A modular bed and seat system for a vehicle's rear cargo area comprises side panels and support panels. The side panels mount to the vehicle's walls and include mounting features. The support panels are telescoping with a spring mechanism and can engage with the side panels' mounting features. This design allows for easy installation and reconfiguration. The system can be arranged as a horizontal bed, a seat with a slanted back, or a seat with a table surface. Some versions include wheel well recesses in the side panels. An alternative embodiment features bed risers and crossbars on the side panels, enabling raised bed configurations. The modular nature of the system provides flexibility, allowing users to adapt the cargo area for various activities. The design facilitates easy installation, removal, and reconfiguration, making it a versatile solution for different vehicle types and user needs.

18 Claims, 10 Drawing Sheets

(56) References Cited

U.S. PATENT DOCUMENTS

| | | | |
|---|---|---|---|
| 5,967,054 | A | 10/1999 | Rosenfeld |
| 6,270,137 | B1 | 8/2001 | Minix |
| 6,733,060 | B1 | 5/2004 | Pavkov |
| 9,004,567 | B2 | 4/2015 | Gerhardt |
| 10,118,559 | B2 | 11/2018 | Dhillon |
| 10,421,407 | B2 | 9/2019 | Hughes |
| 10,913,398 | B2 | 2/2021 | Hanley |
| 11,124,247 | B2 * | 9/2021 | Sosnowich ........ B62D 33/0207 |
| 11,419,427 | B2 * | 8/2022 | Niemela ................. F16B 12/28 |
| D972,483 | S | 12/2022 | Sullivan et al. |
| 11,607,051 | B2 | 3/2023 | Natuzzi |
| 11,833,955 | B1 * | 12/2023 | Sullivan ............... B60N 2/3095 |
| 2006/0180623 | A1 | 8/2006 | Reynolds |
| 2019/0126836 | A1 | 5/2019 | Navarro |
| 2019/0322220 | A1 * | 10/2019 | Linn ....................... B60R 5/041 |
| 2020/0070730 | A1 | 3/2020 | Gill |
| 2020/0114802 | A1 | 4/2020 | Laguana |
| 2021/0070214 | A1 | 3/2021 | Hoedl |
| 2021/0146844 | A1 * | 5/2021 | Smith .................... B60R 5/045 |

* cited by examiner

MODULAR VAN SYSTEM

CROSS REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to vehicle accessories, and more particularly to a modular bed and seat system for a cargo area of a vehicle.

BACKGROUND

Recreational vehicles, vans, and other vehicles with cargo areas have long been used for both transportation and temporary living quarters. Over the years, various systems have been developed to make these spaces more versatile and comfortable for users. These systems typically include convertible furniture arrangements that can transform between seating, sleeping, and storage configurations.

Many existing designs feature fixed or semi-permanent installations that divide the cargo area into designated zones for different functions. Some systems use sliding mechanisms to reposition components, while others employ folding or pivoting elements to change configurations. Common features include bench seats that convert into beds, tables that can be raised or lowered, and storage compartments integrated into the vehicle's structure.

More recent innovations have focused on modular designs that allow for some degree of customization. These systems often use track-mounted components or interlocking panels that can be rearranged to suit different needs. Some designs incorporate telescoping or expandable elements to maximize space utilization.

However, the majority of existing systems have limitations in terms of flexibility, ease of installation, and adaptability to different vehicle types. Many require permanent modifications to the vehicle interior, limiting their transferability between vehicles.

Others are complex to reconfigure, making frequent changes between modes impractical for users.

There remains a need for a truly modular and easily reconfigurable system that can be quickly installed in and removed from a variety of vehicles without permanent modifications. Such a system would ideally offer multiple configuration options for seating, sleeping, and storage. It would be advantageous if the system were compact when not in use, simple to adjust without tools, and durable enough to withstand frequent reconfiguration. An invention meeting these criteria would greatly enhance the versatility and functionality of vehicle cargo areas for a wide range of users and applications. The present invention accomplishes these objectives.

SUMMARY OF THE INVENTION

The present invention is a modular bed and seat system for use in a vehicle's rear cargo area. The system comprises a pair of side panels and multiple support panels. Each side panel has six sides and includes mounting features on its inner side. The support panels are telescoping, with two pieces that engage to form a complete panel. These panels have a spring mechanism that urges their opposing lateral sides apart.

The support panels can be compressed and then released to engage with the side panels' mounting features. This design allows for easy installation and reconfiguration of the system within the vehicle. The mounting features can be apertures, prongs, or slots, depending on the specific embodiment.

The system can be arranged in various configurations, including a horizontal bed, a seat with a slanted back, or a seat with a table surface. Some embodiments include wheel well recesses in the side panels to accommodate vehicle wheel wells.

An alternative version of the system includes bed risers and crossbars on the side panels. This configuration allows for raised bed arrangements, with the ability to mount multiple support panels between the crossbars.

The modular nature of the system allows for flexibility in use, enabling users to adapt the cargo area for sleeping, sitting, or other activities as needed. The design facilitates easy installation, removal, and reconfiguration within the vehicle, making it a versatile solution for various vehicle types and user needs.

The present invention overcomes the drawbacks of the prior art by providing a truly modular and easily reconfigurable system that can be quickly installed in and removed from a variety of vehicles without permanent modifications. This novel system offers multiple configuration options for seating, sleeping, and storage, adapting to diverse user needs. The invention is compact when not in use, simple to adjust without tools, and durable enough to withstand frequent reconfiguration. By solving these longstanding issues, the present invention greatly enhances the versatility and functionality of vehicle cargo areas for a wide range of users and applications. The modular bed and seat system described herein provides a flexible, user-friendly solution for maximizing the utility of vehicle cargo spaces, addressing the limitations of existing designs and offering unprecedented adaptability. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
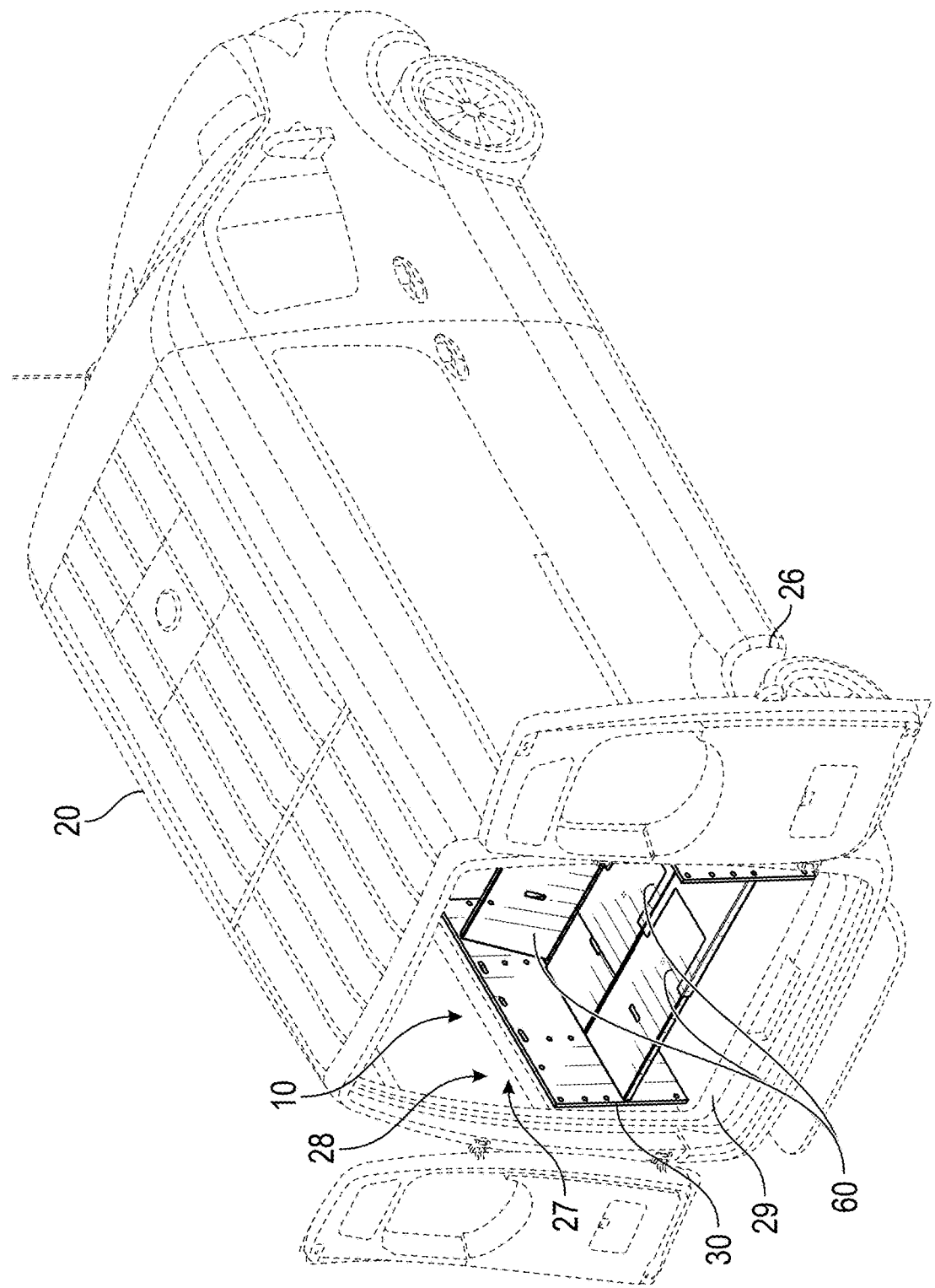
FIG. 1 is a rear perspective view of the invention as installed in a rear cargo area of a vehicle.
Figure 2:
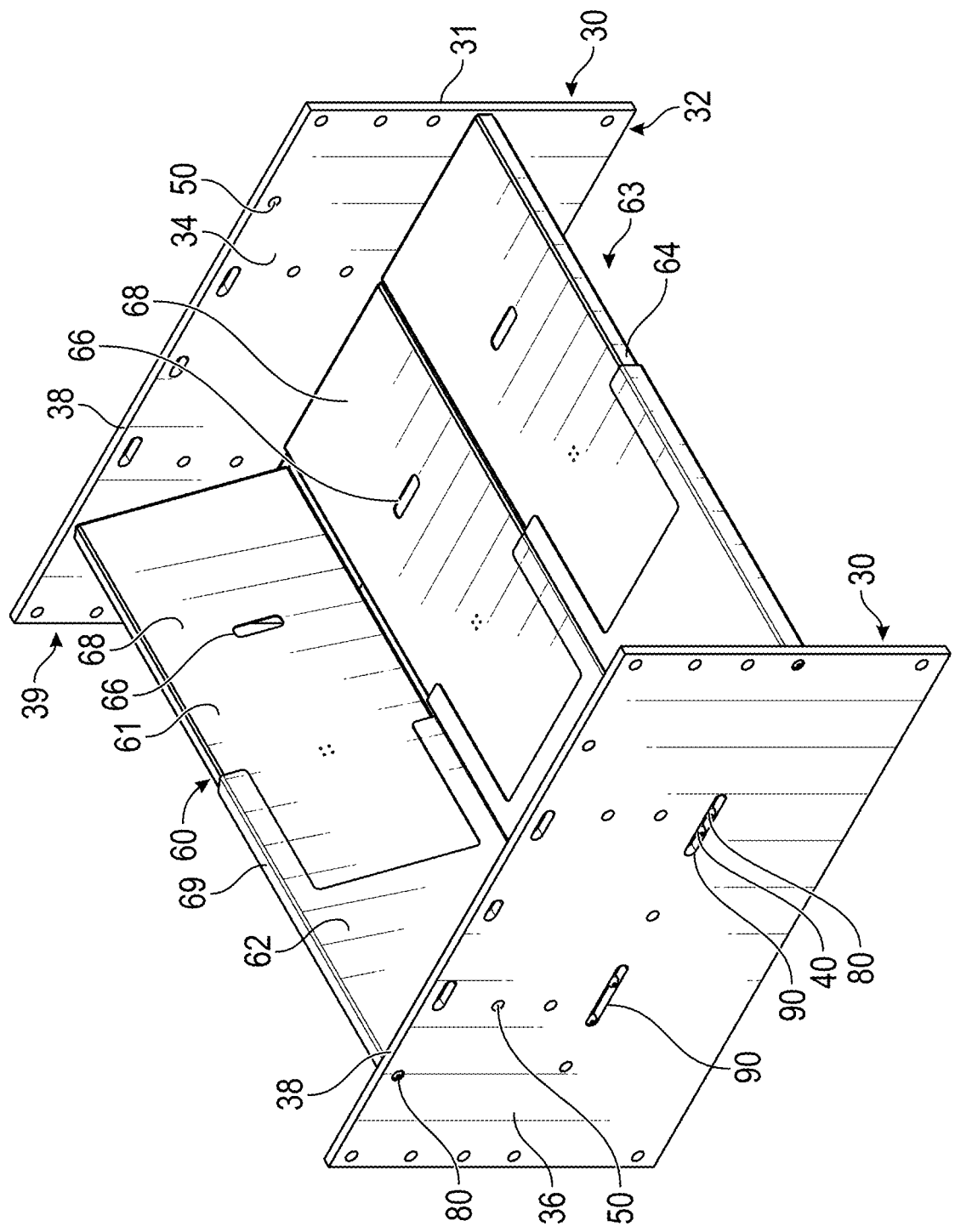
FIG. 2 is a top perspective view of one embodiment of the invention, configured to have a seat that includes two support panels with a slanted back support panel.
Figure 4:
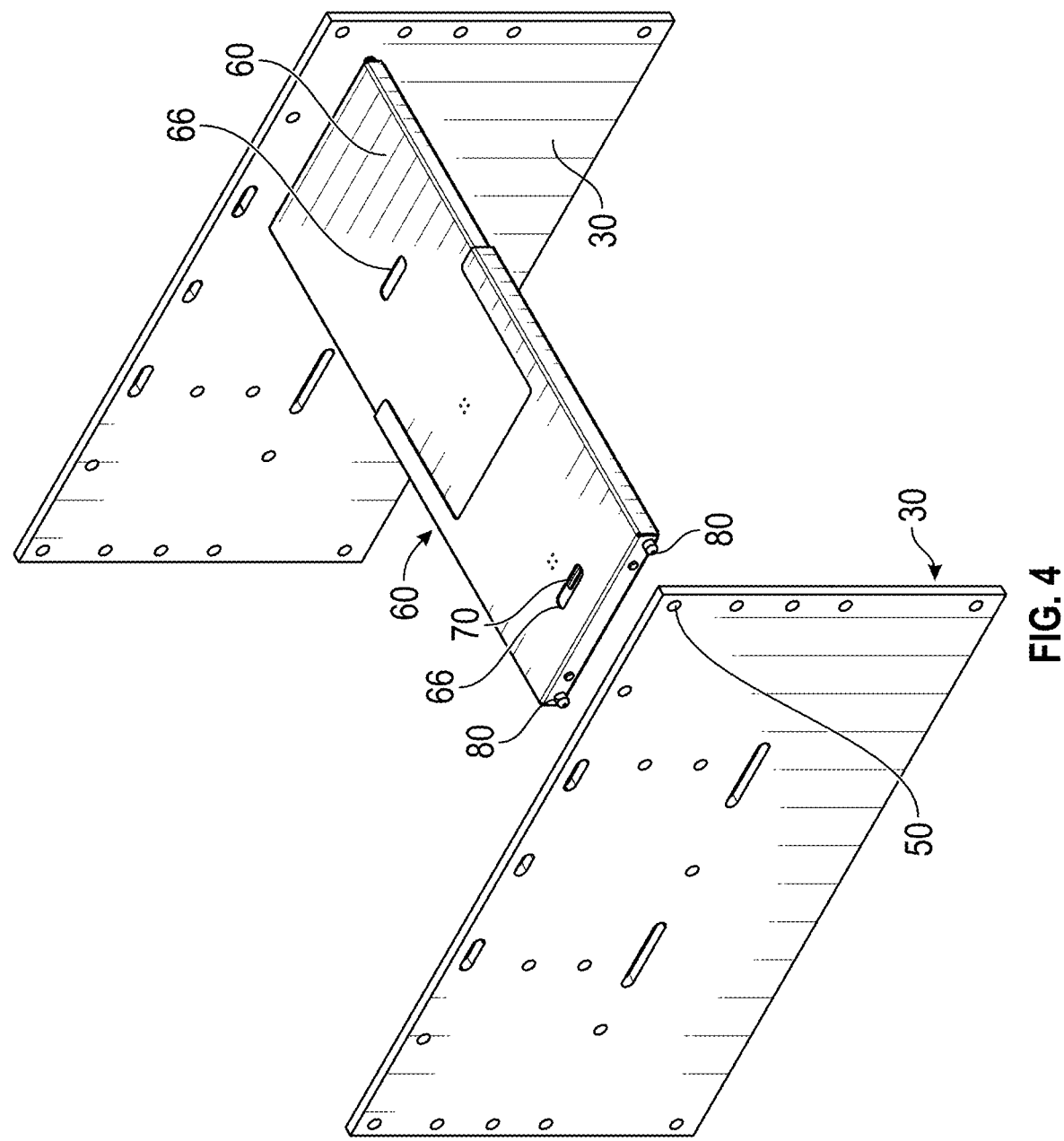
FIG. 4 is a top perspective view showing one of the support panels as compressed to fit between two side panels.

FIGS. 1, 2 and 4 illustrate a modular bed and seat system 10 for use in a vehicle 20 of the type having a rear cargo area 27 defined by at least two side walls 28 and a floor 29. The modular bed and seat system 10 comprises a pair of side panels 30 and a plurality of support panels 60.

Each side panel 30 has a front side 31, a rear side 39, an inner side 34, an outer side 36, a top side 38, and a bottom side 32. The inner side 34 of each side panel 30 includes at least two mounting apertures 50. Such side panels 30 may be constructed from materials such as aluminum, steel, high-strength plastics, composite materials, or the like.

The plurality of support panels 60 each include a first piece 61 telescopingly affixed with a second piece 62. When mutually engaged, the first piece and second piece form the support panel 60 having a top side 68, a bottom side 63, a front side 64, a rear side 69, and two opposing lateral sides 65. A spring mechanism 70 urges the two opposing lateral sides 65 away from each other. Such support panels 60 may be made from materials such as lightweight metals, reinforced plastics, wood, or the like. The spring mechanism 70 may comprise metal springs, elastic bands, pneumatic cylinders, resilient materials, or the like.

Two mounting prongs 80 project laterally away from each lateral side 65 of the support panels 60 and are adapted for engaging two of the mounting apertures 50 on the inner side 34 of one of the side panels 30. Such mounting prongs 80 may be constructed from durable materials such as hardened steel, reinforced plastics, or the like.

As shown in FIG. 1, with each side panel 30 mounted to the two side walls 28 of the rear cargo area 27 of the vehicle 20, each support panel 60 can be compressed by pushing each lateral side mutually together against the spring mechanism 70. This allows the mounting prongs 80 of the support panel 60 to become aligned with the mounting apertures 50 on the inner side 34 of one of the side panels 30. When released, the mounting prongs 80 of the support panel 60 become engaged with the mounting apertures 50 on the inner side 34 of one of the side panels 30.

As illustrated in FIG. 4, the top side 68 of each support panel 60 includes a finger slot 66 in each of the first piece 61 and the second piece 62. These finger slots 66 provide a convenient gripping point for the user to compress the support panel 60. To compress the support panel 60, the user engages the finger slots 66 of the first piece 61 and the second piece 62 with their fingers and presses each piece mutually together against the force of the spring mechanism 70. The finger slots 66 further allow for easy alignment and insertion of the mounting prongs 80 into the mounting apertures 50 on the side panels 30. Once aligned, the user can release the pressure, allowing the spring mechanism 70 to expand the support panel 60 and securely engage the mounting prongs 80 with the mounting apertures 50. An actuator (not shown) can be included with the spring mechanism to release the spring mechanism 70 to allow the support panel 60 to be compressed. Preferably such an actuator is adjacent to one of the finger slots 66 on the rear side 69 of the support panel 60, thereby easy to actuate when the user's fingers are engaged with the finger slot 66.

Figure 6:
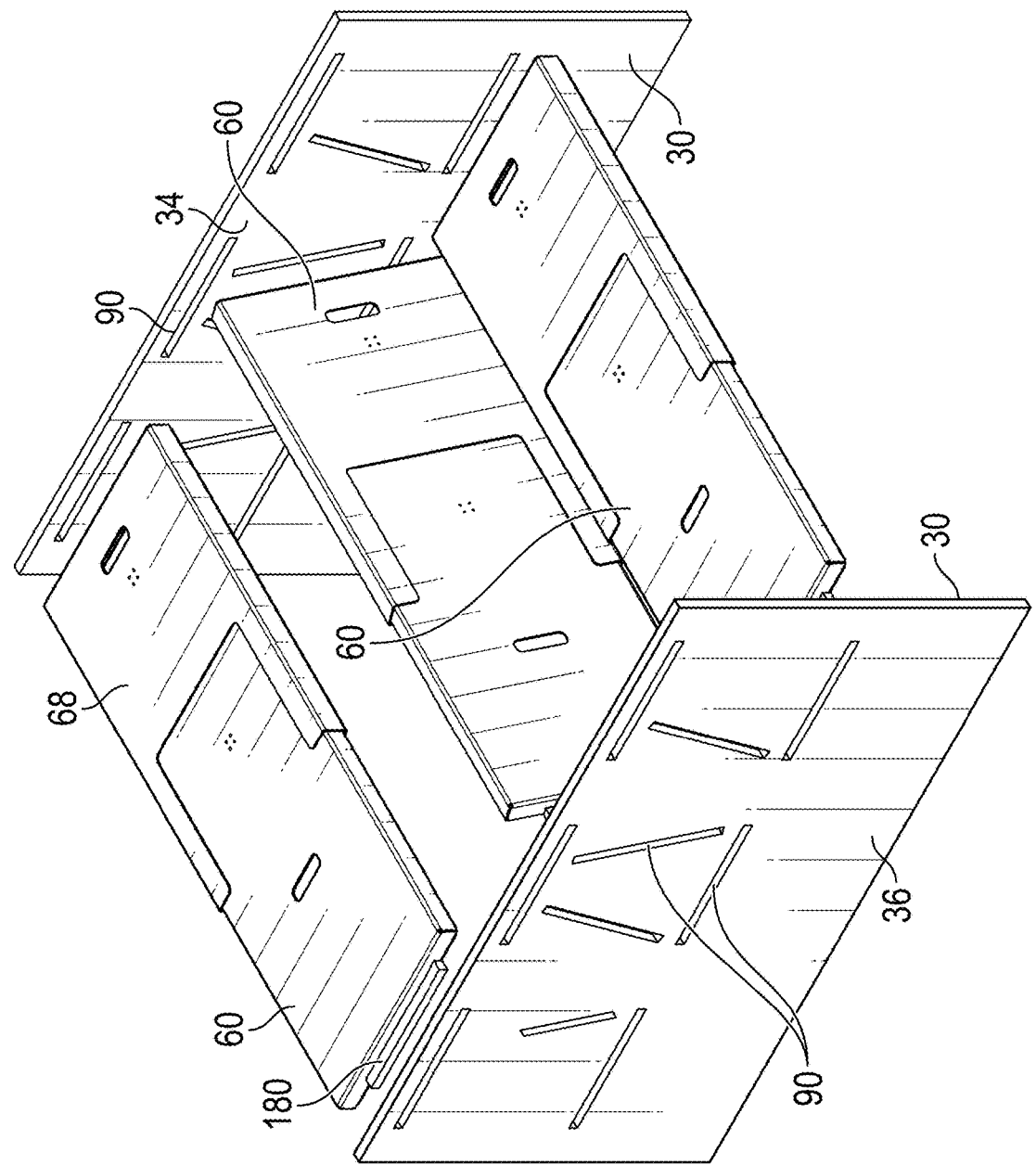
FIG. 6 is a top perspective view of an embodiment wherein the side panels include mounting slots, and wherein the support panels include cooperative mounting protrusions.

As illustrated in FIG. 6, in an alternative embodiment, the inner side 34 of each side panel 30 may include at least one mounting slot 90. Such mounting slot 90 is configured for slidably receiving one or more of the mounting prongs 80. The mounting slot 90 may be horizontal or slanted with respect to the top side 38 of the side panel 30.

Figure 3:
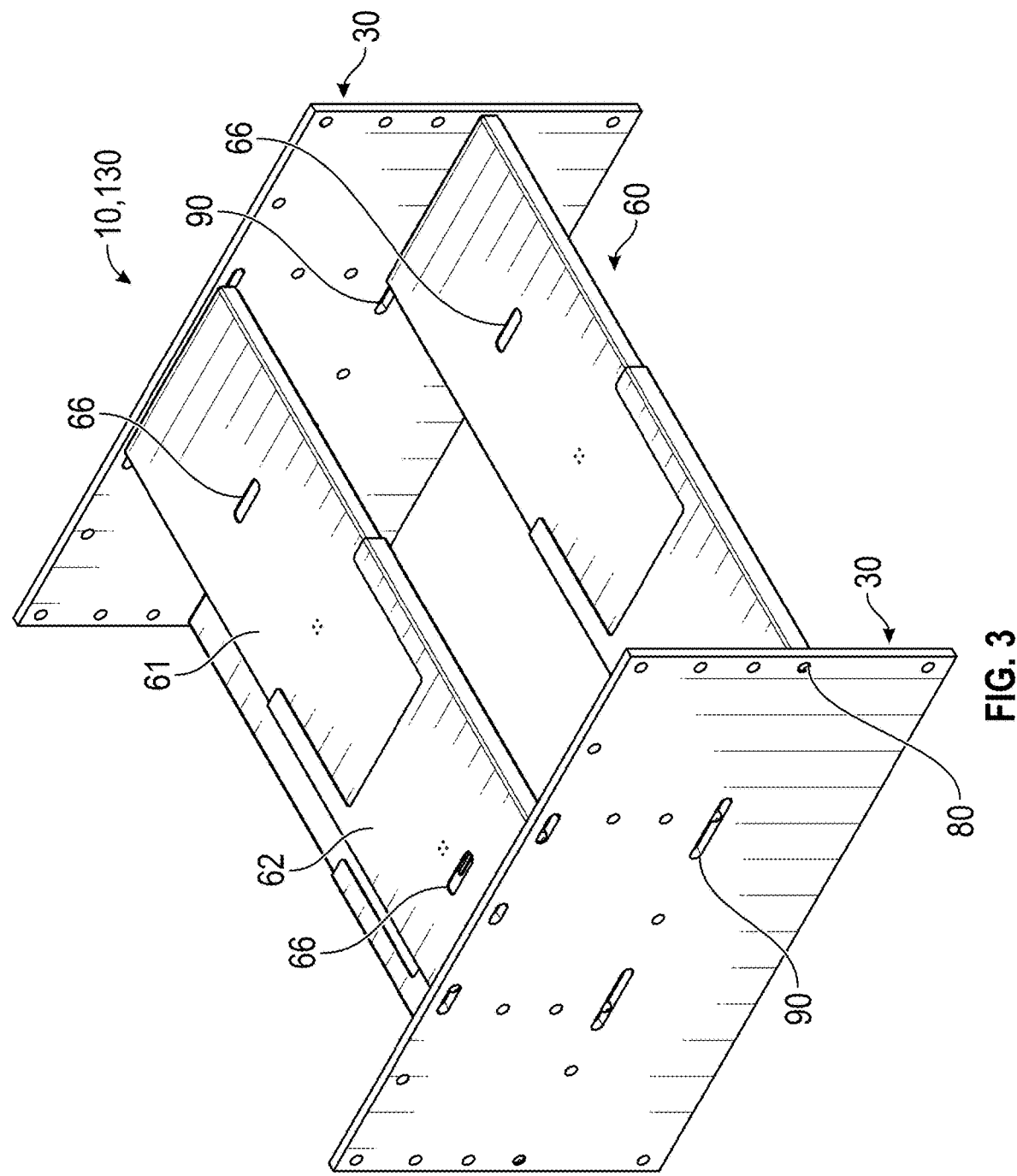
FIG. 3 is a top perspective view of one embodiment of the invention, configured to have two seat support panels and a table support panel.
Figure 7:
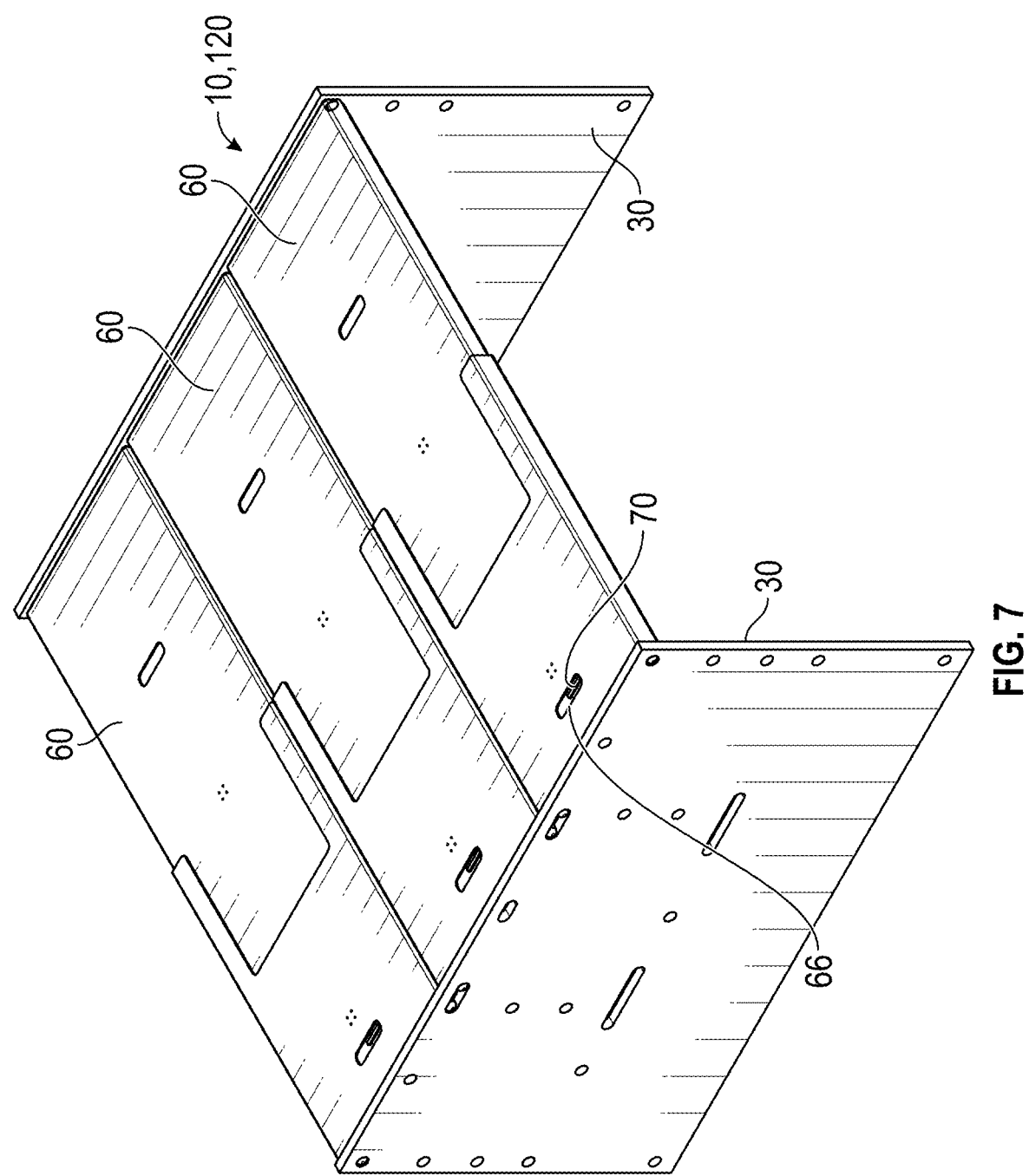
FIG. 7 is a top perspective view of the invention, illustrating bed panels and side panels forming a horizontal bed configuration.

FIG. 7 shows how the support panels 60 can be arranged to form a horizontal bed 120. Alternatively, as depicted in FIG. 2, the support panels 60 can be arranged to form a seat with a slanted back support panel. FIG. 3 illustrates how the support panels 60 can be arranged to form a seat support surface and a table support surface 130.

Figure 8:
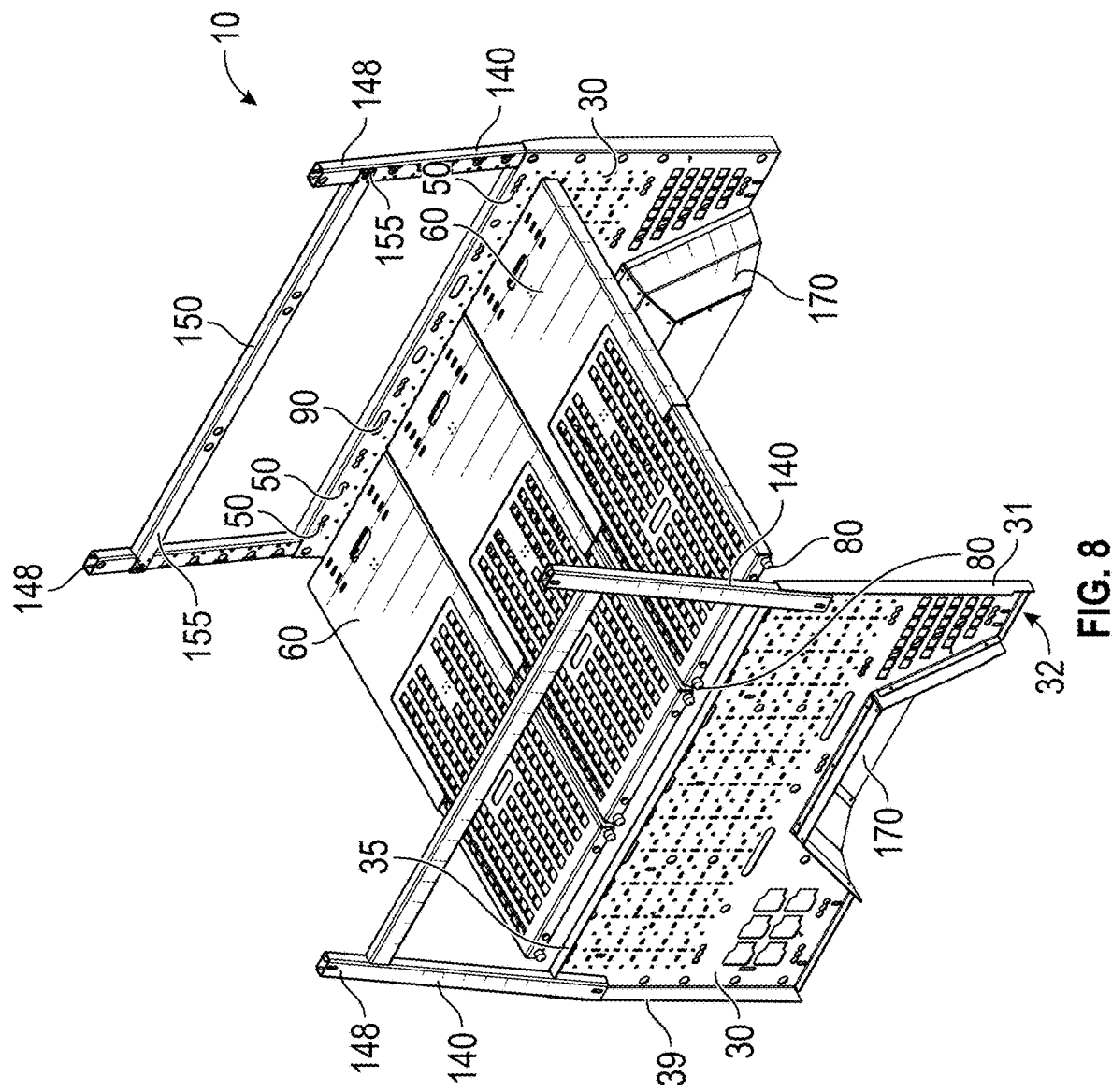
FIG. 8 is a top perspective view of an alternate embodiment of the invention wherein each side panel includes a pair of bed risers and a crossbar, the support panels shown compressed.

As shown in FIG. 8, the bottom side of each side panel 30 may include a wheel well recess 170 for accommodating a wheel well 26 of the vehicle 20. Such wheel well recess 170 may be shaped and sized to fit various vehicle models and can be made from the same material as the side panels 30 or from a different, potentially more flexible material.

Figure 9:
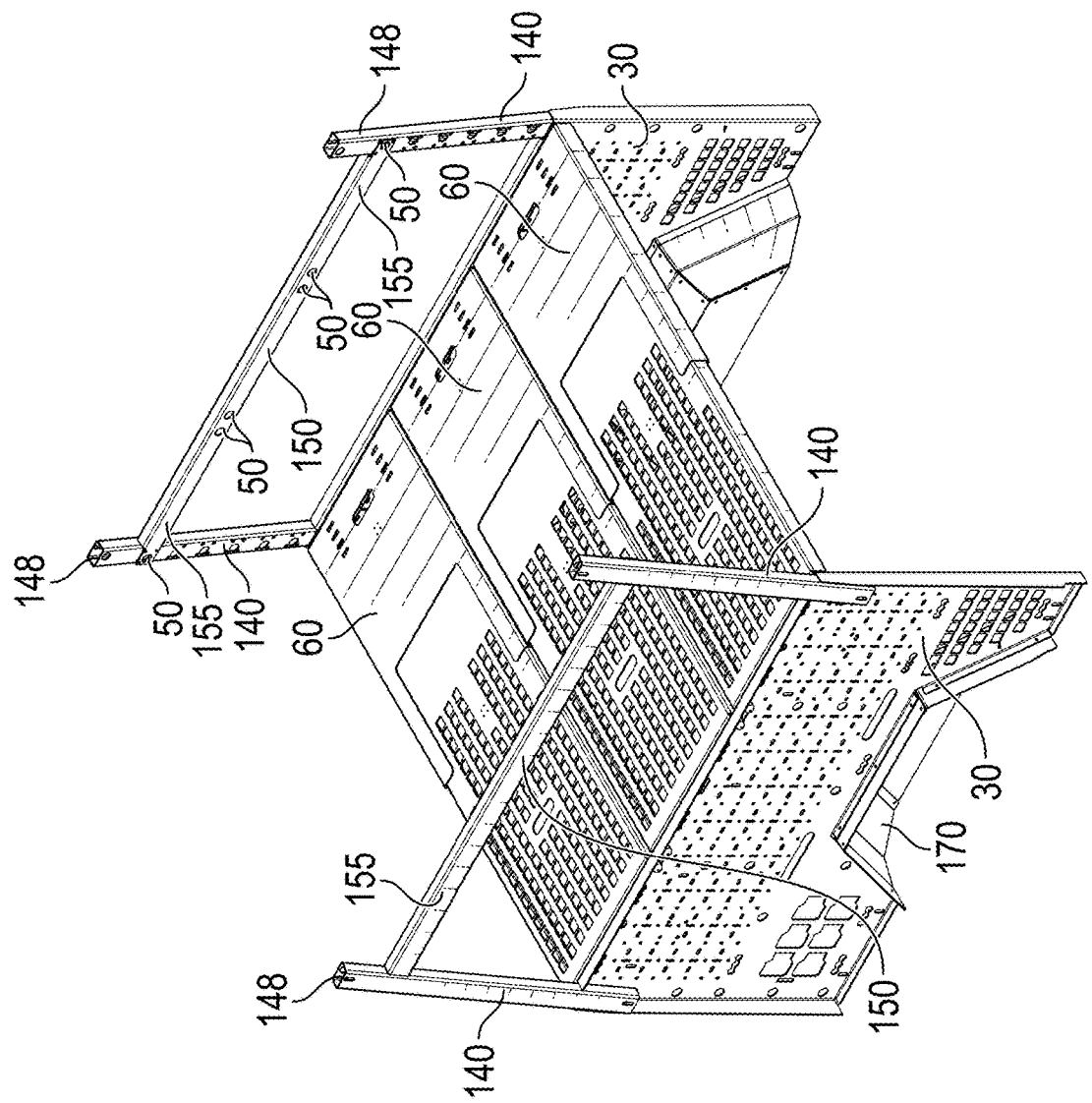
FIG. 9 is a top perspective view of the embodiment of FIG. 8, showing the support panels released to engage the side panels.
Figure 10:
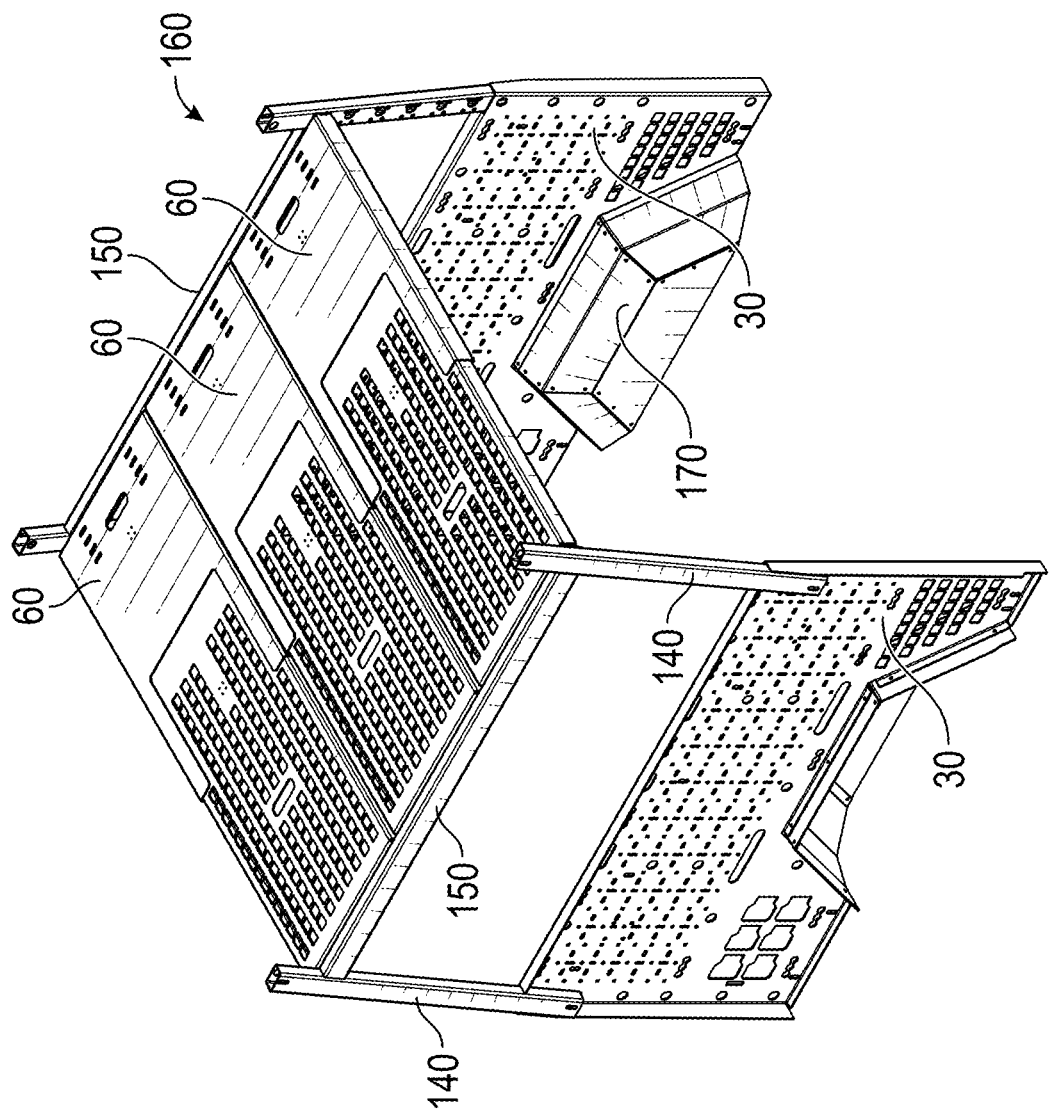
FIG. 10 is a top perspective view of the embodiment of FIG. 8, illustrating the support panels in a raised bed configuration.

FIGS. 8, 9, and 10 illustrate an embodiment where each side panel 30 includes a pair of bed risers 140 projecting upwardly proximate the front side and the back side of the side panel 30. Each bed riser 140 terminates at a top end 148 thereof with one of two opposing ends 155 of a crossbar 150. The crossbar 150 includes at least two of the mounting apertures 50, allowing each support panel 60 to be mounted between each crossbar at the at least two mounting apertures 50. Such bed risers 140 and crossbars 150 may be constructed from sturdy materials such as steel, aluminum, reinforced plastics, or the like.

In a variation of this embodiment, each crossbar 150 includes at least six of the mounting apertures 50. This configuration allows three of the support panels 60 to be mounted between each crossbar to form a raised bed configuration 160, as shown in FIG. 10.

Figure 5:
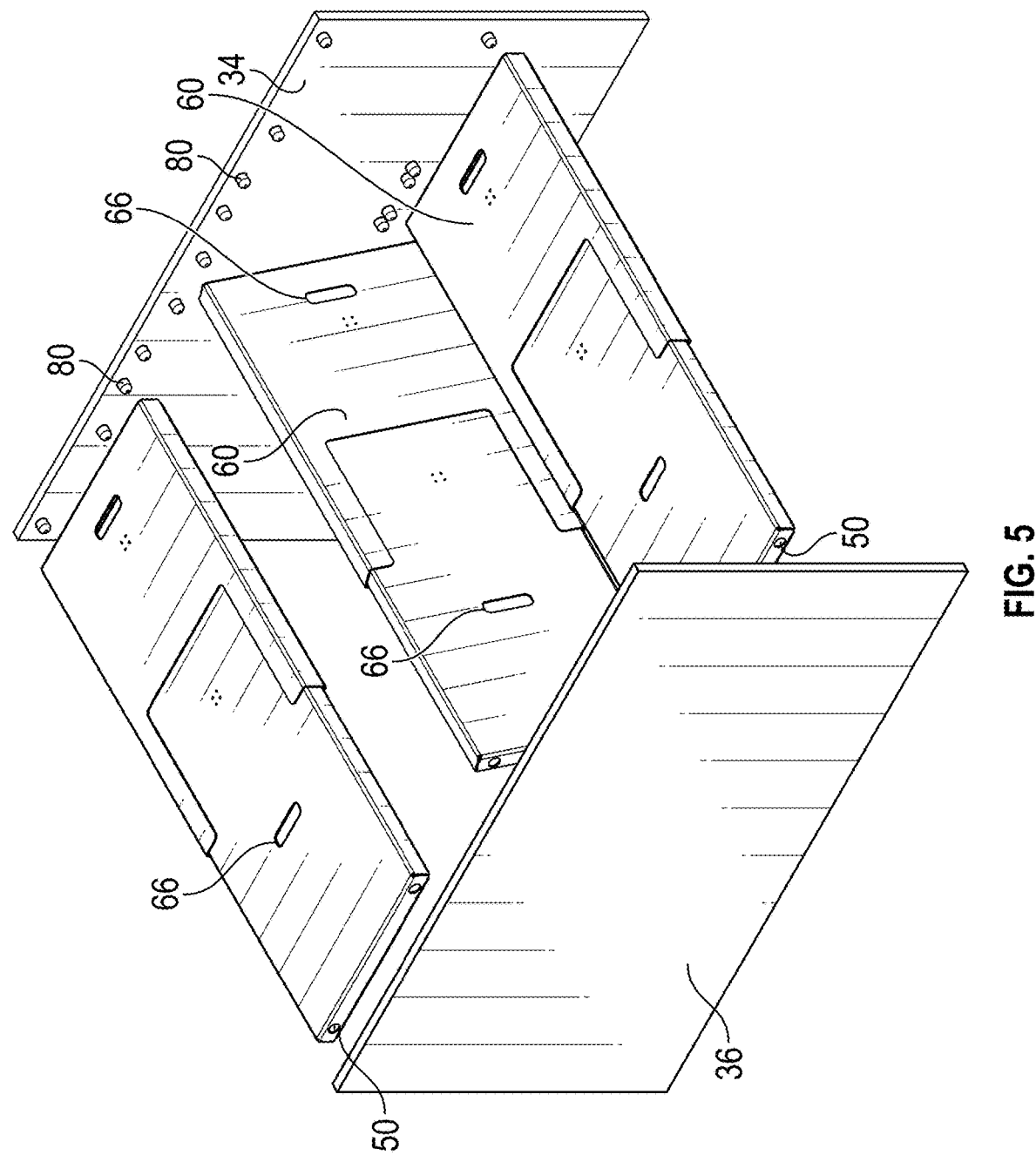
FIG. 5 is a top perspective view of an embodiment wherein the side panels include mounting prongs, and wherein the support panels include mounting apertures.

In another embodiment illustrated in FIG. 5, the modular bed and seat system 10 comprises side panels 30 with at least two mounting prongs 80 projecting laterally inward from the inner side 34. The support panels 60 in this embodiment include at least two mounting apertures 50 on each lateral side 65, adapted for engaging the mounting prongs 80 on the inner side 34 of one of the side panels 30.

FIG. 6 depicts yet another embodiment where the modular bed and seat system 10 includes side panels 30 with at least two mounting slots 90 on the inner side 34. The support panels 60 in this configuration have two elongated mounting protrusions 180 projecting laterally away from each lateral side 65, each adapted for engaging one of the mounting slots 90 on the inner side 34 of one of the side panels 30. Such elongated mounting protrusions 180 may be made from durable materials such as hardened steel, high-strength plastics, or the like.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms.

Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A modular bed and seat system for use in a vehicle having a rear cargo area defined by at least two side walls and a floor, the modular bed and seat system comprising:
    a pair of side panels each having a front side, a rear side, an inner side, an outer side, a top side, and a bottom side, the inner side of each side panel including at least two of mounting apertures; and
    a plurality of support panels each including a first piece telescopingly affixed with a second piece, the first piece and second piece when mutually engaged forming the support panel having a top side, a bottom side, a front side, a rear side, and two opposing lateral sides, a spring mechanism urging the two opposing lateral sides away from each other, two mounting prongs projecting laterally away from each lateral side and adapted for engaging two of the mounting apertures on the inner side of one of the side panels;
    whereby with each side panel mounted to the at least two side walls of the rear cargo area of the vehicle, each support panel is compressed by pushing each lateral side mutually together against the spring mechanism to allow the mounting prongs of the support panel to become aligned with the mounting apertures on the inner side of one of the side panels, and then released to allow the mounting prongs of the support panel to become engaged with the mounting apertures on the inner side of one of the side panels.

2. The modular bed and seat system of claim 1 wherein the inner side of each side panel further includes at least one mounting slot, each mounting slot configured for slidably receiving one or more of the mounting prongs.

3. The modular bed and seat system of claim 2 wherein the at least one mounting slot is horizontal.

4. The modular bed and seat system of claim 2 wherein the at least one mounting slot is slanted with respect to the top side of the side panel.

5. The modular bed and seat system of claim 1 wherein the support panels can be arranged to form a horizontal bed.

6. The modular bed and seat system of claim 4 wherein the support panels can be arranged to form a seat with a slanted back support panel.

7. The modular bed and seat system of claim 4 wherein the support panels can be arranged to form a seat with a slanted back support panel and a table support surface.

8. The modular bed and seat system of claim 1 wherein the bottom side of each side panel includes a wheel well recess for accommodating a wheel well of the vehicle.

9. The modular bed and seat system of claim 1 wherein each side panel includes a pair of bed risers projecting upwardly proximate the front side and the back side of the side panel, each bed riser terminating at a top end thereof with one of two opposing ends of a crossbar, the crossbar including at least two of the mounting apertures, whereby each support panel may be mounted between each crossbar at the at least two mounting apertures.

10. The modular bed and seat system of claim 9 wherein each crossbar includes at least six of the mounting apertures, whereby three of the support panels may be mounted between each crossbar to form a raised bed configuration.

11. The modular bed and seat system of claim 1 wherein the top side of each support panel includes a finger slot in each of the first piece and the second piece, whereby the support panel is compressed by engaging the finger apertures of the first piece and the second piece and pressing each piece mutually together.

12. A modular bed and seat system for use in a vehicle having a rear cargo area defined by at least two side walls and a floor, the modular bed and seat system comprising:
   a pair of side panels each having a front side, a rear side, an inner side, an outer side, a top side, and a bottom side, the inner side of each side panel including at least two mounting prongs projecting laterally inward; and
   a plurality of support panels each including a first piece telescopingly affixed with a second piece, the first piece and second piece when mutually engaged forming the support panel having a top side, a bottom side, a front side, a rear side, and two opposing lateral sides, a spring mechanism urging the two opposing lateral sides away from each other, each lateral side including at least two mounting apertures adapted for engaging the mounting prongs on the inner side of one of the side panels;
   whereby with each side panel mounted to the at least two side walls of the rear cargo area of the vehicle, each support panel is compressed by pushing each lateral side mutually together against the spring mechanism to allow the mounting apertures of the support panel to become aligned with the mounting prongs on the inner side of one of the side panels, and then released to allow the mounting prongs of the side panel to become engaged with the mounting apertures on the lateral sides of the support panel.

13. The modular bed and seat system of claim 12 wherein the support panels can be arranged to form a horizontal bed.

14. The modular bed and seat system of claim 12 wherein the support panels can be arranged to form a seat with a slanted back support panel.

15. The modular bed and seat system of claim 12 wherein the support panels can be arranged to form a seat with a slanted back support panel and a table support surface.

16. The modular bed and seat system of claim 12 wherein each side panel includes a pair of bed risers projecting upwardly proximate the front side and the back side of the side panel, each bed riser terminating at a top end thereof with one of two opposing ends of a crossbar, the crossbar including at least two of the mounting prongs, whereby each support panel may be mounted between each crossbar at the at least two mounting apertures on the lateral sides of the support panel.

17. The modular bed and seat system of claim 16 wherein each crossbar includes at least six of the mounting prongs, whereby three of the support panels may be mounted between each crossbar to form a raised bed configuration.

18. A modular bed and seat system for use in a vehicle having a rear cargo area defined by at least two side walls and a floor, the modular bed and seat system comprising:
   a pair of side panels each having a front side, a rear side, an inner side, an outer side, a top side, and a bottom side, the inner side of each side panel including at least two mounting slots; and
   a plurality of support panels each including a first piece telescopingly affixed with a second piece, the first piece and second piece when mutually engaged forming the support panel having a top side, a bottom side, a front side, a rear side, and two opposing lateral sides, a spring mechanism urging the two opposing lateral sides away from each other, two elongated mounting protrusions projecting laterally away from each lateral side and each adapted for engaging one of the mounting slots on the inner side of one of the side panels;
   whereby with each side panel mounted to the at least two side walls of the rear cargo area of the vehicle, each support panel is compressed by pushing each lateral side mutually together against the spring mechanism to allow the elongated mounting protrusions of the support panel to become aligned with the mounting slots on the inner sides of the side panels, and then released to allow the elongated mounting protrusions of the support panel to become engaged with the mounting slots on the inner sides of each side panels.

* * * * *